United States Patent Office 3,419,606
Patented Dec. 31, 1968

3,419,606
4-(2-METHYLENEALKANOYL)PHENYLSULFINYL ALKANOIC ACIDS
John B. Bicking, Lansdale, Pa., assignor to Merck & Co., Inc., Rahway, N.J., a corporation of New Jersey
No Drawing. Filed May 13, 1964, Ser. No. 367,199
2 Claims. (Cl. 260—515)

ABSTRACT OF THE DISCLOSURE

[4-(2-methylenealkanoyl)phenylsulfinyl]alkanoic acid products which may be substituted in the benzene ring by halogen, alkyl, alkoxy or by a 1,3-butadienylene chain; and the non-toxic salts, esters and amide derivatives thereof. The products are useful as diuretics in the treatment of conditions associated with edema.

The compounds of the invention are prepared via the reaction of a corresponding [4-(2-methylenealkanoyl)phenylthio]alkanoic acid analog with a suitable oxidizing agent.

---

This invention relates to a new class of [4-(2-methylenealkanoyl)phenylsulfinyl]alkanoic acids having utility as diuretics and to a novel method for their preparation.

The products of this invention are characterized by an ability to lower undesirable or dangerous excesses of fluid levels in the body together with a concomitant elimination of salts. Thus, the products of the invention may be employed in the treatment of edematous conditions resulting from an excessively high concentration of electrolyte or fluid in the body as, for example, in the treatment of congestive heart failure and other diseases associated with edema.

The [4-(2-methylenealkanoyl)phenylsulfinyl]-alkanoic acids of the invention are compounds having the following structure:

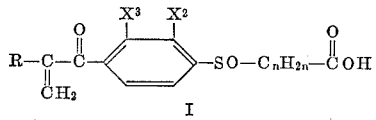

I wherein R is a member selected from the group consisting of hydrogen, lower alkyl, e.g., methyl, ethyl, isopropyl, etc. and halo-lower alkyl such as trihalomethyl substituted lower alkyl, e.g., 2,2,2-trifluoroethyl, 2,2,2-trifluoroisopropyl, etc.; $X^2$ and $X^3$ represent similar or dissimilar radicals selected from the group consisting of hydrogen, halogen, e.g., chlorine, bromine, etc., lower alkyl, e.g., methyl, ethyl, etc., lower alkoxy, e.g., methoxy, ethoxy, etc. and taken together $X^2$ and $X^3$ represent 1,3-butadienylene, i.e., —CH=CH—CH=CH—; and $n$ is an integer having a value of 1–4.

This invention also relates to the non-toxic, pharmacologically acceptable acid addition salts of the instant [4-(2-methylenealkanoyl)phenylsulfinyl]alkanoic acids, which salts are prepared by the reaction of the said alkanoic acids with a base having a non-toxic, pharmacologically acceptable cation. In general, any base which will form an acid addition salt with a carboxylic acid and whose pharmacological properties will not cause an adverse physiological effect when ingested by the body system is considered as being within the scope of this invention. Suitable bases thus include, for example, the alkali metal and alkaline earth metal hydroxides, carbonates, etc., ammonia, primary, secondary and tertiary amines such as monoalkylamines, dialkylamines, trialkylamines, nitrogen containing heterocyclic amines, e.g., piperidine, etc.

Also included within the scope of this invention are the ester and amide derivatives of the instant [4-(2-methylenealkanoyl)phenylsulfinyl]alkanoic acids, which are prepared by conventional methods well-known to those skilled in the art. Thus, for example, the ester derivatives may be prepared by the reaction of a [4-(2-methylenealkanoyl)phenylsulfinyl]alkanoic acid with an alcohol as, for example, with a lower alkyl alcohol or, alternatively, the [4-(2-methylenealkanoyl)phenylsulfinyl]alkanoic acid may be converted to its acid halide by conventional methods and the acid halide thus formed may be reacted with an appropriate lower alkanol. An amide derivative of the instant products may be prepared by treating an acid halide of the said product with ammonia or an appropriate dialkylamine to produce the corresponding amide or, alternatively, a product of the invention may first be converted to its corresponding ester derivative and the said ester treated with ammonia or an appropriate alkylamine or dialkylamine to produce the corresponding amide compound. These and other equivalent methods for the preparation of the ester and amide derivatives of the [4-(2-methylenealkanoyl)phenylsulfinyl]alkanoic acids of the invention will be apparent to one having ordinary skill in the art.

The acid addition salts, esters and amide derivatives described above are the functional equivalent of the corresponding alkanoic acid products and one skilled in the art will appreciate that to the extent that the alkanoic acids of the invention are useful in therapy, the variety of acid addition salts, esters and amides embraced by this invention are limited only by the criterion that the bases, alcohols, etc. employed in forming the salts, esters and amides be both non-toxic and physiologically acceptable.

A preferred subgroup of compounds according to this invention are the [4-(2-methylenealkanoyl)phenylsulfinyl]alkanoic acids of the following formula:

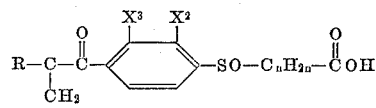

wherein R represents lower alkyl, e.g., methyl, ethyl, isopropyl, etc.; $X^2$ and $X^3$ represent similar or dissimilar radicals selected from the group consisting of hydrogen, halogen, e.g., chlorine, bromine, etc. and lower alkyl, e.g., methyl, ethyl, etc. and $n$ is an integer having a value of 1–2. Also included within the preferred embodiment are the non-toxic, pharmacologically acceptable acid addition salts, esters and amide derivatives of the [4-(2-methylenealkanoyl)phenylsulfinyl]alkanoic acid products described above; for example, the alkali metal and alkaline earth metal salts thereof, such as sodium, potassium or calcium salts, the lower alkyl esters thereof, for example, the corresponding ethyl, propyl or butyl esters and the corresponding amide derivatives of the above-described compounds, for example, the mono-lower alkylamido derivatives and the di-lower alkylamido derivatives thereof, such as methylamido, ethylamido, dimethylamido, etc.

The [4-(2-methylenealkanoyl)phenylsulfinyl]alkanoic acids of the invention are conveniently prepared by the reaction of their corresponding [4-(2-methylenealkanoyl)phenylthio]alkanoic acid analogs with a suitable oxidizing agent. Suitable oxidants for use in the process include, for example, hydrogen peroxide, peracetic acid, meta-chloroperbenzoic acid or, in general, any of the organic per acids. Although I have found the foregoing "per" compounds to be most suitable as oxidizing reagents in the process, one skilled in the art will appreciate that any one of a wide variety of other reagents may also be employed provided the said oxidant will not cause a competing reaction to occur so as to inhibit the formation of the desired product. The following equation illustrates the reaction:

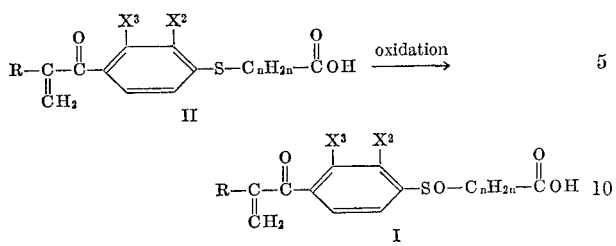

wherein the radicals R, $X^2$, $X^3$ and $n$ are as defined above.

The [4-(2-methylenealkanoyl)phenylthio]alkanoic acid reactants (II, supra) of the instant process are conveniently prepared from known compounds by the diazotization of a suitable aniline compound with an acidic, aqueous solution of sodium nitrite; the diazonium chloride thus formed is treated with an appropriate thio-substituted alkanoic acid to produce the corresponding phenylthioalkanoic acid (V, infra) and the latter is then treated with an alkanoyl halide in the presence of anhydrous aluminum chloride to obtain the corresponding (4-alkanoylphenylthio)alkanoic acid (IV, infra); the said (4-alkanoylphenylthio)alkanoic acid is then treated with formaldehyde or paraformaldehyde and the acid addition salt of a secondary amine, e.g., dimethylamine hydrochloride, piperidine hydrochloride, etc., according to the Mannich reaction, and the [4-(2-secondary-aminomethylalkanoyl)phenylthio]alkanoic acid hydrochloride (III, infra) thus formed is treated with a weak base, e.g., an aqueous solution of sodium bicarbonate, followed by treatment with a suitable acid, e.g., hydrochloric acid, to produce the desired [4-(2-methylenealkanoyl)phenylthio]alkanoic acid (II). The following equation illustrates the reaction:

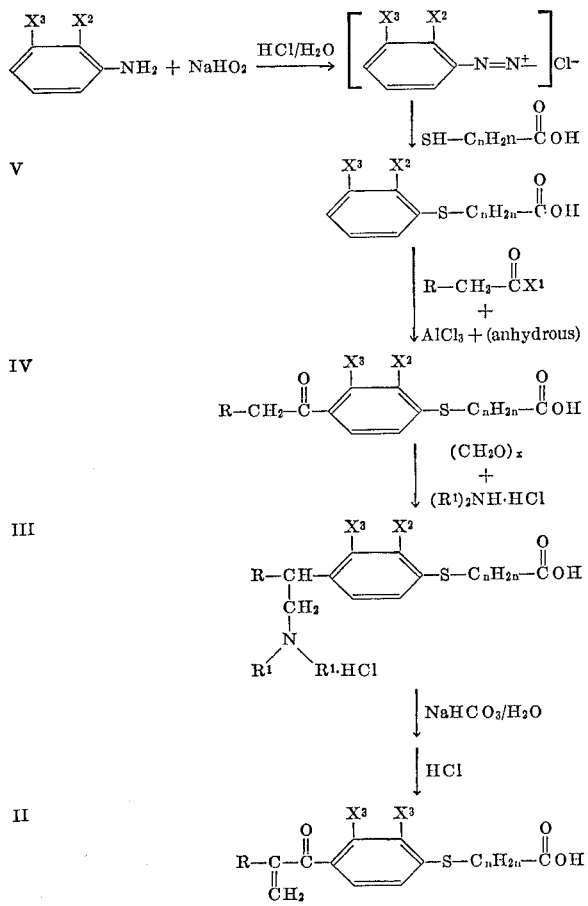

wherein the radicals R, $X^2$, $X^3$ and $n$ are as defined above, $R^1$ represents a member selected from the group consisting of lower alkyl and, taken together with the nitrogen atom to which the $R^1$ radicals are attached, a mononuclear heterocyclic amine, e.g., piperidine, etc., $X^1$ represents halogen, e.g., chlorine, bromine, etc. and $x$ represents an integer having a value of 1 or a number greater than 1.

The [4-(2-methylenealkanoyl)phenylsulfinyl]alkanoic acids of this invention possess diuretic, natriuretic and chloruretic properties and are therefore useful in the treatment of many ailments resulting from an excessive retention of electrolytes, especially sodium chloride or sodium and chloride ions. The products of the invention are particularly valuable in the treatment of hypertension, edema and other conditions associated with electrolyte and fluid retention.

The following example illustrate the method of preparing the [4-(2-methylenealkanoyl)phenylsulfinyl]alkanoic acids of the invention. However, the examples are exemplary only and are not not to be construed as limiting the invention thereto. One skilled in the art will readily perceive that, by substituting the appropriate starting materials for those employed in the examples, all of the [4-(2-methylenealkanoyl)phenylsulfinyl]alkanoic acids falling within the scope of generic Formula I, supra, may be prepared.

EXAMPLE 1

[2,3-dichloro-4-(2-methylenebutyryl)phenylsulfinyl]acetic acid

Step A: (2,3-dichlorophenylthio)acetic acid.—To a solution of 162 g. (1.0 mole) of 2,3-dichloroaniline in a mixture of 250 ml. of concentrated hydrochloric acid and 650 ml. of water is added, dropwise, a solution of 72.5 g. (1.05 mole) of sodium nitrite in 250 ml. of water during 30 minutes at a temperature of 5–10° C. This reaction mixture is then added, during a period of 90 minutes, to a solution of 124 g. (1.35 mole) of thioglycolic acid in a solution of 200 g. (5.0 mole) of sodium hydroxide in one liter of water. The temperature of the reaction mixture is kept at 0–5° C. by means of an ice-salt bath. The reaction mixture is then allowed to warm to room temperature and stand for 18 hours. The sodium salt of the product which separates is collected, dissolved in 700 ml. of hot water and the solution acidified with hydrochloric acid to precipitate the product, which is then recrystallized from benzene to obtain 56.5 g. of (2,3-dichlorophenylthio)acetic acid, M.P. 128–133° C.

Step B: (2,3 - dichloro - 4 - butyrylphenylthio)acetic acid.—Butyryl chloride (16.8 g., 0.16 mole) is added dropwise with stirring to a mixture of 35.5 g. (0.15 mole) of (2,3-dichlorophenylthio)acetic acid, 63 g. (0.48 mole) of aluminum chloride and 200 ml. of carbon disulfide. The mixture is then refluxed for three hours. Carbon disulfide is decanted from the heavy oil which separates and a mixture of ice and hydrochloric acid is added. The solid product is collected and recrystallized from benzene to obtain 29.5 g. of (2,3-dichloro-4-butyrylphenylthio)acetic acid, M.P. 126–129.5° C.

Analysis for $C_{12}H_{12}Cl_2O_3S$.—Calculated: C, 46.91; H, 3.94. Found: C, 47.04; H, 4.20.

Step C: [2,3-dichloro-4-[(2-dimethylaminomethyl)butyryl]phenylthio]acetic acid hydrochloride.—A mixture of 3.1 g. (0.01 mole) of (2,3-dichloro-4-butyrylphenlthio)acetic acid, 0.45 g. (0.015 mole) of paraformaldehyde, 0.9 g. (0.011 mole) of dimethylamine hydrochloride and five drops of acetic acid is heated for one hour on the steam bath. The product crystallizes from the initially clear melt. Recrystallization from isopropyl alcohol yields 1.2 g. of [2,3-dichloro-4-[(2-dimethylaminomethyl)butyryl]phenylthio]acetic acid hydrochloride, M.P. 164–166° C.

Step D: [2,3-dichloro-4-(2-methylenebutyryl)-phenylthio]acetic acid.—[2,3 - dichloro - 4 - [(2 - dimethylaminomethyl)butyryl]phenylthio]acetic acid hydrochloride (21 g., 0.052 mole) is dissolved in 400 ml. of saturated sodium bicarbonate solution at 70° C. The solution is cooled and then acidified with hydrochloric acid to precipitate the product, which is recrystallized from benzene to yield 10.5 g. of [2,3-dichloro-4-(2-methylenebutyryl)-phenylthio]acetic acid, M.P. 131–134° C.

Analysis for $C_{13}H_{12}Cl_2O_3S$.—Calculated: C, 48.91; H, 3.79. Found: C, 48.93; H, 3.82.

Step E: [2,3-dichloro-4-(2-methylenebutyryl)phenylsulfinyl]acetic acid.—To a solution of 3.2 g. (0.01 mole) of [2,3-dichloro-4-(2-methylenebutyryl)phenylthio]acetic acid in 40 ml. of acetic acid is added 1.5 ml. of a 33% solution of hydrogen peroxide (approximately 0.015 mole) in water. The solution is allowed to stand for 50 hours at room temperature. The solution is then diluted with 65 ml. of water and the product which precipitates is recrystallized from aqueous acetic acid to obtain 2.2 g. of [2,3 - dichloro - 4 - (2 - methylenebutyryl)phenylsulfinyl]-acetic acid, M.P. 140–142° C.

Analysis for $C_{13}H_{12}Cl_2O_4S$.—Calculated: C, 46.58; H, 3.61; Cl, 21.15. Found: C, 46.73; H, 3.75; Cl, 21.08.

EXAMPLE 2

(3-chloro-4-methacryloylphenylsulfinyl)acetic acid

Step A: (3-chloro-4-propionylphenylthio)acetic acid.—To a mixture of 55 g. (0.27 mole) of (3-chlorophenylthio)acetic acid and 112 g. (0.85 mole) of aluminum chloride in 300 cc. of carbon disulfide is added 25.7 g. (0.27 mole) of propionyl chloride slowly and with stirring during a period of 30 minutes. The mixture is refluxed for three hours with carbon disulfide, decanted and the viscous precipitate added to a mixture of ice and hydrochloric acid. The oily product obtained is added to a saturated solution of sodium bicarbonate and an insoluble impurity is filtered off. The filtrate is acidified with hydrochloric acid to precipitate (3-chloro-4-propionylphenylthio)acetic acid which, after recrystallization from benzene, gives 31 g. of (3-chloro-4-propionylphenylthio)acetic acid, M.P. 89–91.5° C.

Analysis for $C_{11}H_{11}ClO_3S$.— Calculated: C, 51.05; H, 4.29. Found: C, 51.02; H, 4.55.

Step B: [3-chloro-4-[2-(1-piperidylmethyl)-propionyl]phenylthio]acetic acid hydrochloride.—In a 100 ml. round flask equipped with an outlet tube suitable for application of intermittent suction an intimate mixture of 12.3 g. (0.0476 mole) of (3-chloro-4-propionylphenylthio)acetic acid, 2.1 g. (0.07 mole) of paraformaldehyde, 6.3 g. (0.052 mole) of piperidine hydrochloride and 0.75 cc. of 10% alcoholic hydrogen chloride is heated on the steam bath for about 1.5 hours, during which period suction is applied for about one-minute intervals five or six times. The said reaction produces a viscous melt which is dissolved in 125 cc. of boiling isopropyl alcohol. Upon cooling there is obtained 11.1 g. of [3-chloro-4-[2-(1-piperidylmethyl)propionyl]phenylthio]acetic acid hydrochloride, M.P. 153–155° C.

Step C: (3 - chloro-4-methacryloylphenylthio)acetic acid.—A solution of 3.1 g. (0.008 mole) of [3-chloro-4-[2-(1 - piperidylmethyl)propionyl]phenylthio]acetic acid hydrochloride in 30 cc. of saturated sodium bicarbonate solution is heated one minute on the steam bath. Acidification of the solution with hydrochloric acid precipitates the unsaturated ketone as a gum which soon crystallizes. Several recrystallizations from a mixture of cyclohexane and benzene give 0.6 g. of (3-chloro-4-methacryloylphenylthio)acetic acid, M.P. 110–112° C.

Analysis for $C_{12}H_{11}ClO_3S$.—Calculated: C, 53.23; H, 4.10. Found: C, 53.44; H, 4.13.

Step D: (3-chloro-4-methacryloylphenylsulfinyl)acetic acid.—By substituting (3-chloro-4-methacryloylphenylthio)acetic acid, prepared as described in Step C, for the [2,3 - dichloro - 4-(2-methylenebutyryl)phenylthio]acetic acid of Example 1, Step E, and following substantially the procedure described therein, the compound (3-chloro-4-methacryloylphenylsulfinyl)acetic acid is prepared.

EXAMPLE 3

(3-methyl-4-methacryloylphenylsulfinyl)acetic acid

Step A: (3-methyl-4-propionylphenylthio)acetic acid.—This product is prepared by following substantially the same procedure described in Example 2, Step A, with the exception that 0.27 mole of (3-methylphenylthio)acetic acid is employed in place of the (3-chlorophenylthio)acetic acid used in that example. There is thus obtained (3-methyl-4-propionylphenylthio)acetic acid which, after crystallization from aqueous ethanol, melts at 93.5–94.5° C.

Analysis for $C_{12}H_{14}O_3S$.—Calculated: C, 60.48; H, 5.92. Found: C, 60.47; H, 5.84.

Step B: [3-methyl-4-[2-(1-piperidylmethyl)propionyl] phenylthio]acetic acid hydrochloride.—A mixture of 17.8 g. (0.075 mole) of (3-methyl-4-propionylphenylthio) acetic acid, 3.8 g. (0.125 mole) of paraformaldehyde, 10.4 g. (0.085 mole) of piperidine hydrochloride and one cc. of 10% alcoholic hydrogen chloride, which is contained in a 100 ml. round flask equipped with an outlet tube suitable for application of intermittent suction, is heated on the steam bath for about 1½ hours, during which period suction is applied for about one-minute intervals five or six times. A syrupy melt is obtained which soon crystallizes. After trituration with hot isopropyl alcohol there is obtained 22.5 g. of [3-methyl-4-[2-(1-piperidylmethyl) propionyl]phenylthio]acetic acid hydrochloride, M.P. 172–174° C.

Step C: (3 - methyl - 4-methacryloylphenylthio)acetic acid.—A solution of 13.5 g. (0.036 mole) of [3-methyl-4-[2-(1 - piperidylmethyl)propionyl]phenylthio]acetic acid hydrochloride in 150 cc. of saturated sodium bicarbonate solution is heated two minutes on the steam bath. Acidification with hydrochloric acid precipitates the unsaturated ketone which, after recrystallization from a mixture of cyclohexane and benzene, gives 3.2 g. of (3-methyl-4-methacryloylphenylthio)acetic acid, M.P. 87.5–89.5° C.

Analysis for $C_{13}H_{14}O_3S$.—Calculated: C, 62.38; H, 5.64. Found: C, 61.85; H, 5.58.

Step D: (3-methyl-4-methacryloylphenylsulfinyl)acetic acid.—By substituting (3-methyl-4-methacryloylphenylthio)acetic acid, prepared as described in Step C, for the [2,3-dichloro - 4 - (2-methylenebutyryl)phenylthio]acetic acid of Example 1, Step E, and following substantially the procedure described therein, the compound (3-methyl-4-methacryloylphenylsulfinyl)acetic acid is prepared.

EXAMPLE 4

3-(3-chloro-4-methacryloylphenylsulfinyl)propionic acid

Step A: 3-(3-chlorophenylthio)propionic acid.—A solution of 14.5 g. (0.10 mole) of 3-chlorothiophenol in 125 cc. of a 5% sodium hydroxide solution is mixed with a solution of 15.9 g. (0.10 mole) of 3-bromo-propionic acid in 150 cc. of saturated sodium bicarbonate solution. After four hours the solution is acidified with hydrochloric acid and the precipitated product recrystallized from aqueous ethanol to give 19.6 g. of 3-(3-chlorophenylthio) propionic acid, M.P. 79.5–81.5° C.

Analysis for $C_9H_9ClO_2S$.—Calculated: C, 49.88; H, 4.19. Found: C, 50.53; H, 4.23.

Step B: 3-(3-chloro-4-propionylphenylthio)propionic acid.—To a mixture of 8.7 g. (0.04 mole) of 3-(3-chlorophenylthio)propionic acid and 16 g. (0.12 mole) of aluminum chloride in 50 cc. of carbon disulfide is added, during 30 minutes, 4.2 g. (0.045 mole) of propionyl chloride with stirring and refluxing. The mixture is refluxed for an additional five hours. Carbon disulfide is then decanted and the viscous precipitate added to ice and hydrochloric acid. The oil that separates sodifies and after recrystallization from aqueous acetic acid yields 3.1 g. of 3-(3-chloro-4-propionylphenylthio)-propionic acid, M.P. 73–75.5 C.

Analysis for $C_{12}H_{13}ClO_3S$.—Calculated: C, 52.84; H, 4.80. Found: C, 52.83; H, 5.00.

Step C: 3-[3-chloro-4-[2-(2-piperidylmethyl)propionyl]phenylthio]propionic acid hydrochloride.—A mixture of 13.7 g. (0.05 mole) of 3-(3-chloro-4-propionylphenylthio)propionic acid, 2.5 g. (0.085 mole) of paraformaldehyde, 6.7 g. (0.055 mole) of piperidine hydrochloride and one cc. of 10% alcoholic hydrogen chloride is heated 1.25 hours on the steam bath to give 3-[3-chloro-4-[2-(1-piperidylmethyl)propionyl]phenylthio]propionic acid hydrochloride.

Step D: 3 - (3 - chloro-4-methacryloylphenylthio)propionic acid.—The 3-[3-chloro-4-[2-(1-piperidylmethyl)propionyl]phenylthio]propionic acid hydrochloride obtained as a syrupy melt in Step C is triturated with boiling ether. The residue is dissolved in 250 cc. of saturated sodium bicarbonate solution and after 30 minutes the solution is acidified with hydrochloric acid to precipitate 3 - (3-chloro - 4-methacryloylphenylthio)propionic acid which, after five recrystallizations from a mixture of cyclohexane and benzene, gives 4.5 g. of 3-(3-chloro-4-methacryloylphenylthio)propionic acid, M.P. 81–83° C.

Analysis for $C_{13}H_{13}ClO_3S$.—Calculated: C, 54.83; H, 4.60; Cl, 12.45. Found: C, 54.7; H, 4.62; Cl, 12.28.

Step E: 3-(3-chloro-4-methacryloylphenylsulfinyl)-propionic acid.—By substituting 3-(3-chloro-4-methacryloylphenylthio)propionic acid, prepared as described in Step D, for the [2,3-dichloro-4-(2-methylenebutyryl)phenylthio]acetic acid of Example 1, Step E, and following substantially the procedure described therein, the compound 3-(3-chloro-4-methacryloylphenylsulfinyl)propionic acid is prepared.

By substituting the appropriate aniline reactant for the 2,3-dichloroaniline of Example 1, Step A, and following substantially the procedure described in Steps A through E of that example the corresponding [4-(2-methylenealkanoyl)phenylsulfinyl]alkanoic acid products are prepared. The following equation illustrates the reaction described in Example 1, Step E, and the accompanying Table I depicts the starting materials of the reaction and the final products which are produced thereby.

TABLE I

| Ex. | R | X² | X³ | —$C_nH_{2n}$— |
|---|---|---|---|---|
| 5 | —$CH_2$—$CH_3$ | H | Cl | —CH— \| $CH_3$ |
| 6 | —CH—$CH_3$ \| $CH_3$ | H | Cl | —$CH_2$— |
| 7 | —CH—$CH_3$ \| $CH_3$ | Cl | Cl | —$CH_2$— |
| 8 | —$CH_2$—$CF_3$ | —$CH_3$ | —$CH_3$ | —$CH_2$— |
| 9 | —CH—$CF_3$ \| $CH_3$ | H | —$CH_3$ | —$CH_2$— |
| 10 | —$CH_2$—$CH_3$ | —CH=CH—CH=CH— | | —$CH_2$— |
| 11 | —$CH_2$—$CH_3$ | H | —$OCH_3$ | —$CH_2$— |
| 12 | —$CH_2$—$CH_3$ | —$CH_3$ | —$CH_3$ | —$CH_2$— |
| 13 | —$CH_2$—$CH_3$ | H | Cl | —$CH_2$— |
| 14 | —$CH_2$—$CH_3$ | Cl | —$CH_3$ | —$CH_2$— |
| 15 | —$CH_2$—$CH_3$ | —$CH_3$ | Cl | —$CH_2$— |

It will be apparent from the foregoing description that the [4-(2-methylenealkanoyl)phenylsulfinyl]-alkanoic acids of the present invention constitute a valuable class of compounds which have not been prepared heretofore. One skilled in the art will also appreciate that the processes disclosed in the above examples are merely illustrative and are capable of wide variation and modification without departing from the spirit of this invention.

What is claimed is:
1. A compound of the formula:

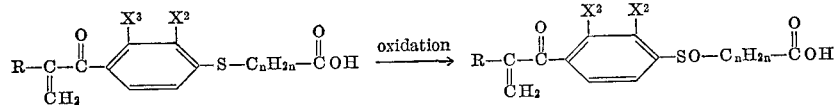

wherein R is lower alkyl and $n$ is an integer having a value of 1–2.

2. [4-(2-methylenebutyryl)naphthylsulfinyl]acetic acid.

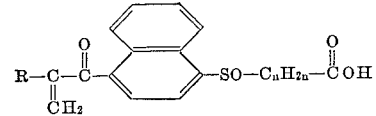

References Cited

UNITED STATES PATENTS 3,255,241  6/1966  Schultz et al. ____ 260—470 X

FOREIGN PATENTS 221,261  9/1922  Germany.

OTHER REFERENCES

Szmant, H. H. Chemistry of the Sulfoxide Group, N.Y. Pergamon Press, 1961, vol. 1, Chapter 16, pp. 157–158, ed. by N. Kharasch, Organic Sulfur Compounds.

JAMES A. PATTEN, *Primary Examiner.*

M. G. BERGER, *Assistant Examiner.*

U.S. Cl. X.R.

167—65; 260—516, 470, 558, 559, 141, 293.4, 544